Jan. 19, 1960   J. A. SZLACHCIC ET AL   2,921,570
INTERNAL COMBUSTION ENGINE FUEL SUPPLY CONTROL
Filed March 18, 1959
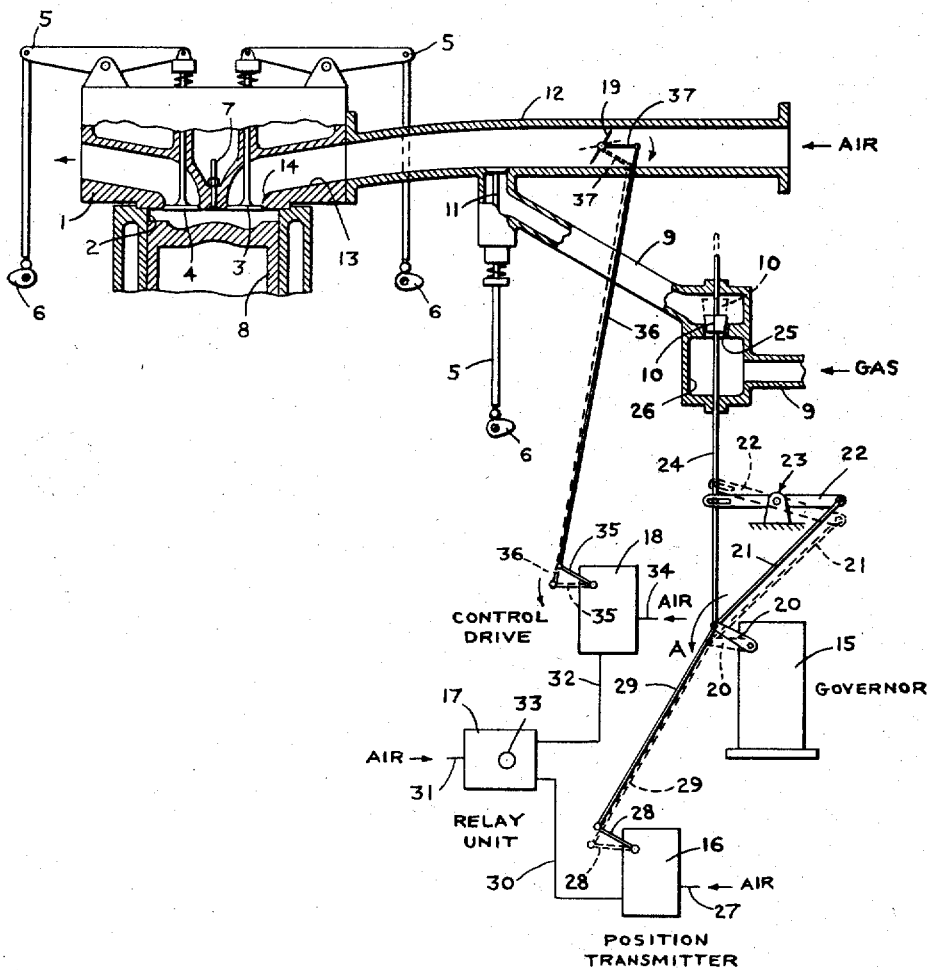
JULIAN A. SZLACHCIC
WILLIAM T. DUPLER
INVENTORS
BY *Daniel W. Bolis*
*Atty*

United States Patent Office 2,921,570
Patented Jan. 19, 1960

2,921,570

INTERNAL COMBUSTION ENGINE FUEL SUPPLY CONTROL

Julian A. Szlachcic and William T. Dupler, Buffalo, N.Y., assignors to Worthington Corporation, Harrison, N.J., a corporation of Delaware Application March 18, 1959, Serial No. 800,330

5 Claims. (Cl. 123—120)

This invention relates to an improved internal combustion engine of high compression character operating on a gaseous fuel, and more particularly to an improved system for maintaining control of the volume of gaseous fuel and combustion air intake of such an engine over a wide range of load.

In the operation of a high compression engine, the ratio of gaseous fuel to combustion air must at all times be maintained within a narrow, critical range in order that spark discharge can cause ignition and combustion of the whole fuel-air mixture charge to the engine.

It is thus one of the prime objects of the present invention to provide an improved system, characterized by its simplicity of operation and requirement of few component parts, for maintaining this close control over the fuel-air ratio, and for maintaining this control throughout a wide range of rated engine load.

This improved system includes valve means in the intake conduits for the gaseous fuel and combustion air respectively, and calls for manipulation of these said valve means to vary the volume of each in accordance with changing engine load. Accordingly, the valve means in the gaseous fuel intake conduit is manipulated or controlled by an engine driven governor which is responsive to changing engine load, and thus follows present day practice. However, as a departure from present day practice, the valve means in the combustion air intake is manipulated or controlled by an independent control drive which is responsive to air signals which are also adapted to be a function of engine loading. More specifically, to apply this functional relationship to the air signals transmitted to the control drive, a well known type of unit capable of issuing air signals in varying controlled magnitudes is utilized, this said unit being installed to continuously sense the position of the said engine-driven governor and to transmit air signals corresponding to changing governor positions to the control drive. Thus, in the system of the present invention independent control is actually maintained over the volume of gaseous fuel and combustion air intake, respectively, resulting in few and simple component parts for the said system, and whereas each of the two controlling units thereof operates as a function of engine load, the fuel-air ratio of the fuel mixture is controlled in accordance with this changing condition to maintain maximum engine efficiency and fuel economy throughout the entire range of rated engine load.

In the single figure drawing, there is shown a fragmentary vertical section taken centrally through a typical internal combustion engine cylinder, and indicated therewith more or less diagrammatically are the fuel supply lines to said engine cylinder and the units comprising the novel volume control system of the present invention. More particularly, two positions of the movable parts of said control system are shown in said figure, one being in phantom perspective.

Referring to the drawing, the reference numeral 1 indicates generally a cylinder head mounted on a cylinder 2 of a four cycle, high compression gas engine. Disposed in the cylinder head 1 are a main gas admission valve 3 and an exhaust valve 4, each opened at an appropriate point in time during the engine cycle by a rocker 5 actuated from an engine cam shaft 6, and each closed by a usual spring mechanism 3a, 4a acting on their respective valve stems. A usual spark plug 7 is supported in cylinder head 1 for igniting a gaseous fuel-air mixture delivered into cylinder 2, the combustion of which mixture causes reciprocation of a piston 8 within cylinder 2. The gas for said gaseous fuel-air mixture is derived from any suitable source, flowing therefrom through a conduit 9 having a first and second valve 10 and 11 therein, which valves when open admit the gas into a conduit 12 through which air is being flowed to the engine cylinder 2. The mixing of the gas and air in conduit 12 results in a gaseous fuel-air mixture which then flows into a cylinder head passageway 13 and eventually enters into cylinder 2 through valve opening 14 when valve 3 is unseated. Valve 11 in conduit 9, like valves 3 and 4, is also opened by a rocker 5 actuated from an engine cam shaft 6 in timed relation in the engine cycle, and is closed by a usual spring mechanism 11a acting on its valve stem. Valve 10 on the other hand is operated by a suitable engine speed responsive governor 15 located relatively adjacent the engine. This governor and valve arrangement is provided so that as engine load decreases (speed thereby increasing), the governor will effect a decrease in the volume of gaseous fuel being admitted to cylinder 2 by partially closing valve 10, and thus conserve fuel.

Thus far, the structure and operation thereof that has been described is relatively well known to those familiar with the art, and except for valve 10 controlled by speed responsive governor 15 does not form an essential part of the present invention. However, what now follows is a description of the component parts and operation of the control system for the fuel supply of the engine and is considered to be the crux of the present invention.

*The control system*

In addition to the speed responsive governor 15 operatively connected to control the valve 10, the improved fuel control system of the present invention is generally comprised of three well known types of units, one being designated 16 and hereinafter referred to as a position transmitter, the second designated 17 and referred to as a relay unit, and the third designated 18 and referred to as a control drive. The control drive 18 is operatively connected to control a usual type butterfly valve 19 in conduit 12 and thus maintains control over the volume of combustion air intake to the engine cylinder 2. This phase of operation will be explained in more detail subsequently.

The governor 15 and the three above named units, namely, the position transmitter 16, the relay unit 17, and the control drive 18, are all well known types of apparatus, readily purchasable on the open market and capable of performing their respective intended functions without substantial modification. Thus, it is not believed necessary to describe the internal structure of any of these units inasmuch as their respective general mode of operation and cooperative relationship to each other which will be described in detail is all that is necessary for a complete understanding of the present invention.

Although the connection between the governor 15 and the engine is not shown, it will be understood to be of the usual type which permits the governor to be responsive to changing engine speed and thus changing engine load. More specifically, such changes in engine load are reflected by the governor 15 through changes in position of a governor lever 20 rotatable in the direction of the arrow A, the position of said lever shown in solid lines corresponding to minimum load engine operation and that shown in phantom perspective corresponding to practically maximum load engine operation. A link 21 pivotably connected at one end to the free end of lever 20, and pivotably connected at its other end to a bar 22 pivotable about a central fulcrum point 23 and itself pivotably connected at an end to the valve stem 24 of valve 10, is utilized to relay changes in position of lever 20 to valve 10. Thus, when the engine is operating at minimum rated load, valve 10 is barely unseated from the valve opening 25 and only a minimum volume of the gaseous fuel within valve chamber 26 is permitted to flow through the said valve opening into conduit 12, and from thence to flow on to the engine cylinder 2 when valve 3 opens during the fuel intake phase of the engine cycle. Yet, when the engine is operating at increased load, as for example maximum rated load, lever 20 is caused to rotate in the direction of Arrow A, and thereby effects through link 21 and pivoting bar 22 a complete unseating of valve 10 from valve opening 25, and thereby permits a maximum volume of gaseous fuel to be supplied to the engine cylinder 2.

The position transmitter 16 has a connection 27 to a source of pressurized air of a magnitude of about 15 p.s.i. (pounds per square inch) and is adapted when its operating lever 28 is in various positions of rotation from the end position shown in solid lines to the end position shown in phantom perspective to transmit air signals of a minimum magnitude of 3 p.s.i. in increasing increments up to a maximum magnitude of 15 p.s.i. By pivotably connecting the free end of the position transmitter lever 28 to a link 29 which has its opposite end pivotably connected to the free end of the governor lever 20, the air signals transmitted by the position transmitter 16 are made to correspond to changing positions of the governor lever 20. In other words, position transmitter 16 acting through link 29 continuously senses the position of the governor lever 20 and is adapted to transmit an air signal corresponding to this sensed governor lever position. Since each position assumed by the governor lever 20 is a function of engine load, each air signal transmitted by position transmitter 16 is also a function of engine load. As previously indicated, in the position of the position transmitter lever 28 shown in solid lines and corresponding to minimum load engine operation, a minimum air signal of 3 p.s.i. is transmitted; in the position shown in phantom perspective and corresponding to maximum load engine operation an increased maximum air signal of 15 p.s.i. is transmitted; and in positions of rotation from the former to the latter, air signals in increasing increments between these stated minimum and maximum magnitudes are transmitted.

The transmitted air signals from the position transmitter 16 are directed to the relay unit 17 via a conduit 30. This unit also has a connection 31 to a source of pressurized air of a magnitude of 15 p.s.i. and is adapted to transmit air signals corresponding to those received from the position transmitter 16 but in a reversed order of magnitude. In other words, whereas the magnitude of the air signals from the position transmitter 16 corresponding to minimum engine load and up to maximum engine load increase in magnitude, those issuing from the relay unit 17 which correspond to these conditions of engine load decrease in magnitude. The reason for this is that the air signals transmitted by the relay unit 17 are directed via conduit 32 to the control drive 18 to ultimately control combustion air valve 19, and it is desirable that this valve be actuated from its minimum engine load position or practically closed position to its maximum engine load position or fully open position by air signals decreasing in magnitude. Thus, should there be a failure in conduit 32, the air signal transmitted from the relay unit 17 via this conduit to the control drive 18 will drastically be reduced in magnitude but only cause valve 19 to assume its maximum engine load position or fully open position. On the other hand, if the air signals from the position transmitter 16 were directly fed into the control drive 18, valve 19 thereby opening in response to increasing magnitude air signals, drastic reduction in air signal magnitude occasioned by conduit failure would close valve 19 and result in the dangerous situation where an almost pure gaseous fuel charge is being supplied to the engine cylinder 2.

It would of course be possible to have direct transmission of the air signals from the position transmitter 16 to the control drive 18, provided only that the internal controls of the said position transmitter are set so that in the minimum engine load position of lever 28 a maximum magnitude air signal is transmitted, and air signals of decreasing magnitude transmitted in subsequent positions of rotation of lever 28. However, it is preferred to use the relay unit 17, inasmuch as this unit has a usual adjustment knob 33 and internal controls for varying the ratio between input and output signals, and thus provides the control system of the present invention with greater flexibility.

In this respect it will be understood that although proper variation of the volume of gaseous fuel relative to the volume of combustion air 40 to correspond to variations in engine load is according to a complex rather than simple mathematical relationship, this is easily achieved through proper setting of the internal controls of the position transmitter 16 to obtain proper magnitudes of air signals relative to changes in position of its lever 28. However, where several gases are used as fuel, each having a different heating value, additional tailoring of the relative volumes of gaseous fuel and combustion air is required, and it is preferred that this be achieved through adjustment of the adjustment knob 33 of the relay unit 17 rather than by changing the internal control settings of the position transmitter 16.

The control drive 18 receiving the air signals from the relay unit 17 via conduit 32 is a usual type of servo-motor having a connection 34 to a source of high pressure air of a magnitude capable of powering a lever 35, and functioning such that depending upon the magnitude of said air signal, said lever 35 is adapted to be moved into a particular position by the said high pressure air. Thus, the position assumed by lever 35 is a function of the air signal transmitted by the relay unit 17, and whereas the latter is a function of engine load, the assumed position of lever 35 is also a function of this condition. Pivotally connected to the free end of lever 35 is a link 36 which at its opposite end is pivotally connected to the rotatable arm 37 of valve 19. Accordingly, valve 19 which regulates the volume of combustion air which can flow through conduit 12 to engine cylinder 2, and valve 10 which regulates the volume of gaseous fuel which can flow through conduit 9 to said engine cylinder 2, are each respectively controlled as a function of engine load, and the proper ratio of gaseous fuel to combustion air thereby maintained throughout the entire range of rated engine load.

It will be understood that the invention is not to be limited to the specific arrangement of component parts herein shown, but that wide modifications may be made within the invention defined by the claims.

What is claimed is:

1. In an internal combustion engine, a cylinder and piston assembly forming a cylinder combustion space, independent conduits connected to said cylinder combustion space for directing combustion air and gaseous fuel thereto respectively, and a valve means in each said conduit for controlling the volume of flow therethrough, the said valve means in said gaseous fuel conduit being operatively connected to a movable lever of an engine driven governor which is responsive to engine load and being thereby adapted to regulate gaseous fuel flow in accordance with changing engine load, and the valve means in said combustion air conduit being operatively connected to a control drive which is responsive to air signals and being thereby adapted to regulate combustion air flow in accordance with changing air signals transmitted to said control drive, and means for transmitting air signals to said control drive corresponding to changing engine load and thus in accordance with this changing condition.

2. In an internal combustion engine, a cylinder and piston assembly forming a cylinder combustion space, independent conduits connected to said cylinder combustion space for directing combustion air and gaseous fuel thereto respectively, and a valve means in each said conduit for controlling the volume of flow therethrough, the said valve means in said gaseous fuel conduit being operatively connected to a movable lever of an engine driven governor which is responsive to engine load and being thereby adapted to regulate gaseous fuel flow in accordance with changing engine load, and the valve means in said combustion air conduit being operatively connected to a control drive which is responsive to air signals and being thereby adapted to regulate combustion air flow in accordance with changing air signals transmitted to said control drive, and air signal transmission means for transmitting air signals to said control drive, said air signal transmission means being operatively connected to sense the position of said movable lever of said governor and being thereby adapted to transmit air signals corresponding to changing governor lever positions and thus in accordance with changing engine load.

3. The air signal transmission means as claimed in claim 2 in which the transmitted air signals are of decreasing magnitudes corresponding to increasing engine loads, and the combustion air valve means controlled by said transmitted air signals is thereby adapted to move from a closed to an open position in response to said air signals of decreasing magnitudes.

4. In an internal combustion engine, a cylinder and piston assembly forming a cylinder combustion space, independent conduits connected to said cylinder combustion space for directing combustion air and gaseous fuel thereto respectively, a valve in each said conduit for controlling the volume of flow therethrough, an engine driven governor responsive to changing engine load and having a movable lever operatively connected to the valve in said gaseous fuel conduit for controlling the same in accordance with changing engine load, a control drive responsive to air signals and having a movable lever operatively connected to the valve in said combustion air conduit for controlling the same in accordance with changing air signals transmitted thereto, and an air signal transmission means connected to transmit air signals to said control drive and having a movable lever operatively connected to said movable governor lever for sensing the position of the same, the air signals of said air signal transmission means being regulated by changing positions of said last named lever to correspond to changing positions of said movable governor lever.

5. The air signal transmission means as claimed in claim 4 and comprising of a position transmitter and a relay unit, said position transmitter having said operative connection to sense the position of said movable governor lever and being adapted to transmit air signals to the relay unit, and said relay unit having said connection to said control drive for transmitting the air signals thereto and being adapted to regulate the air signals so that they are of decreasing magnitudes corresponding to increasing engine loads, whereby the combustion air valve controlled by said transmitted air signals is adapted to move from a closed to an open position in response to air signals decreasing in magnitude.

References Cited in the file of this patent

UNITED STATES PATENTS 2,744,511     Kauffmann et al.  ---------- May 8, 1956